(12) United States Patent
Kashiwazaki et al.

(10) Patent No.: US 11,632,070 B2
(45) Date of Patent: Apr. 18, 2023

(54) DRIVE SYSTEM

(71) Applicant: DENSO CORPORATION, Kariya (JP)

(72) Inventors: Takashi Kashiwazaki, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 24 days.

(21) Appl. No.: 17/315,518

(22) Filed: May 10, 2021

(65) Prior Publication Data

US 2021/0265937 A1    Aug. 26, 2021

Related U.S. Application Data

(63) Continuation of application No. PCT/JP2019/042677, filed on Oct. 30, 2019.

(30) Foreign Application Priority Data

Nov. 9, 2018  (JP) .............................. JP2018-211782

(51) Int. Cl.
| | |
|---|---|
| H02P 27/04 | (2016.01) |
| H02P 27/06 | (2006.01) |
| H02P 21/22 | (2016.01) |
| H02M 1/00  | (2006.01) |

(52) U.S. Cl.
CPC .............. *H02P 27/06* (2013.01); *H02P 21/22* (2016.02); *H02M 1/0048* (2021.05)

(58) Field of Classification Search
CPC .......... H02P 27/06; H02P 21/22; H02P 25/18; H02M 1/0048
See application file for complete search history.

(56) References Cited

FOREIGN PATENT DOCUMENTS

| CN | 106208856 B | * | 3/2021 | ............. B66B 1/308 |
|---|---|---|---|---|
| JP | S64-034198 A | | 2/1989 | |
| JP | H06-089648 A | | 3/1994 | |
| JP | 2016-181949 A | | 10/2016 | |
| WO | WO-2019159665 A1 | * | 8/2019 | |

OTHER PUBLICATIONS

Feb. 4, 2020 International Search Report issued in International Patent Application No. PCT/JP2019/042677.

* cited by examiner

*Primary Examiner* — Karen Masih
(74) *Attorney, Agent, or Firm* — Oliff PLC

(57) ABSTRACT

A drive system includes: first and second inverters; a high-potential-side connection line; a low-potential-side connection line; a first changeover switch provided to at least one of the high-potential-side and low-potential side connection lines; a second changeover switch connected in parallel to the first changeover switch; a mode control section changing between a first mode in which to perform switching driving of upper and lower arm switches in one of the inverters and perform neutral point driving of at least one of the upper and lower arm switches in the other inverter to maintain in an on state and a second mode in which to perform switching driving of the upper and lower arm switches in both the inverters; and a changeover control section that, at the time of a changeover between the first and second modes, changes the first and second changeover switches between the on and off states.

5 Claims, 10 Drawing Sheets

DRIVE SYSTEM

CROSS-REFERENCE TO RELATED APPLICATION

The present application is based on and claims the benefit of priority from earlier Japanese Patent Application No. 2018-211782 filed on Nov. 9, 2018, the description of which is incorporated herein by reference.

BACKGROUND

Technical Field

The present disclosure relates to a drive system.

Related Art

There has been conventionally known a drive system that controls driving of a rotating electrical machine with open-delta windings.

SUMMARY

As an aspect of the present disclosure, a drive system is provided. The drive system is applied to a rotating electrical machine system having a rotating electrical machine with multi-phase windings. The drive system includes: a first inverter that has an upper arm switch and a lower arm switch connected in series in each phase and has a connection point between the upper arm switch and the lower arm switch connected to a first end of the winding of each phase; a second inverter that has an upper arm switch and a lower arm switch connected in series in each phase and has a connection point between the upper arm switch and the lower arm switch connected to a second end of the winding of each phase; a high potential side connection line that connects a high potential side of the first inverter and a high potential side of the second inverter; a low potential side connection line that connects a low potential side of the first inverter and a low potential side of the second inverter; a first changeover switch that is a semiconductor switch provided to at least one of the high potential side connection line and the low potential side connection line; a second changeover switch that is a relay switch connected in parallel to the first changeover switch; a mode control section that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters; and a changeover control section that, at a time of a changeover between the first mode and the second mode by the mode control section, changes the first changeover switch and the second changeover switch between the on state and off state.

DETAILED DESCRIPTION OF THE PREFERRED EMBODIMENTS

There has been conventionally known a drive system that controls driving of a rotating electrical machine with open-delta windings (for example, refer to JP 2016-181949 A). In this drive system, a first inverter is connected to the first end of the winding of each phase constituting the rotating electrical machine, and a second inverter is connected to the second end. The high potential side of the first inverter and the high potential side of the second inverter are connected together by a high potential side connection line, and the low potential side of the first inverter and the low potential side of the second inverter are connected together by a low potential side connection line. The high potential side connection line and the low potential side connection line are provided with changeover switches. The states of the changeover switches are changed to switch between the driving of the first inverter and the driving of the second inverter.

The upper and lower arm switches of the first inverter and second inverter are semiconductor switches relatively high in switching speed. In order to change the states of the changeover switches and change between the driving of the first inverter and the driving of the second inverter in synchronization with each other, semiconductor switches may be used as changeover switches. However, since semiconductor switches have a relatively large on resistance, the connection lines provided with the changeover switches may suffer increased conduction losses, which leads to larger power losses in the drive system.

The present disclosure provides a drive system that suppresses electric power losses in the drive system.

First Embodiment

Hereinafter, a first embodiment in which a drive system according to the present disclosure is applied to an in-vehicle rotating electrical machine system 100 will be described with reference to the drawings.

Figure 1:
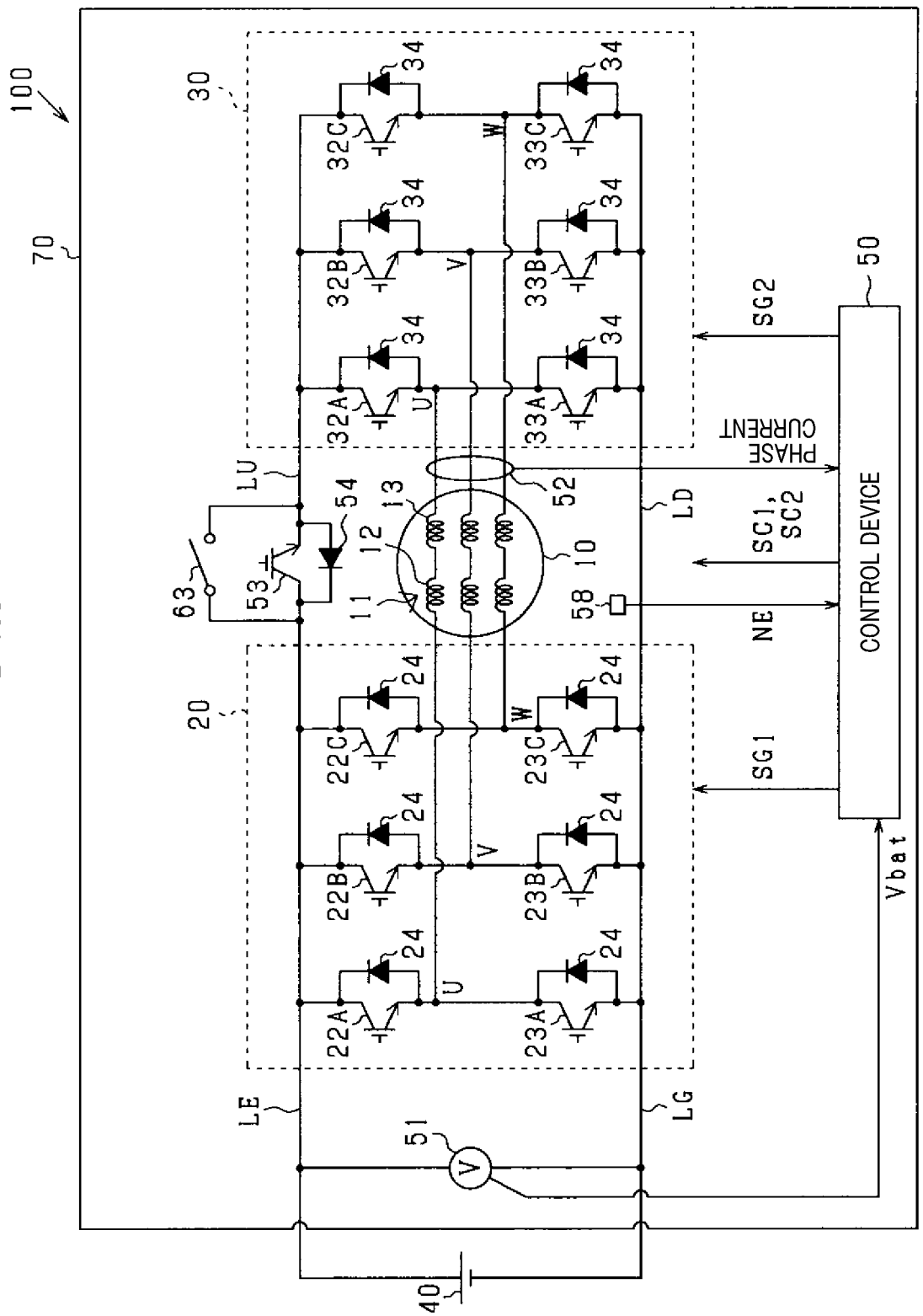
FIG. 1 is an overall configuration diagram of a drive system according to a first embodiment.

As shown in FIG. 1, a drive system 70 according to the present embodiment includes a rotating electrical machine 10, a first inverter 20, a second inverter 30, and a control device 50 that controls the rotating electrical machine 10.

The rotating electrical machine 10 has the function of regenerative power generation and power-running driving, and is specifically a motor generator (MG). The rotating electrical machine 10 receives and supplies electric power to and from a battery 40. During power running, the rotating electrical machine 10 gives a driving force to a vehicle by electric power supplied from the battery 40, and at regenerative power generation, the rotating electrical machine 10 generates electricity by using braking energy of the vehicle and outputs the electric power to the battery 40.

The rotating electrical machine 10 has open-delta three-phase windings 11. The windings 11 are multi-phase windings corresponding to U phase, V phase, and W phase. The winding 11 of each phase includes a first winding part 12 and a second winding part 13 connected in series. The rotating electrical machine 10 has a rotor connected in a manner capable of transferring motive power to the driving wheels of the vehicle. The rotating electrical machine 10 is a synchronous machine, for example.

The winding 11 of each phase in the rotating electrical machine 10 is connected via the first inverter 20 to the battery 40 that is a direct-current power supply part. The battery 40 is a chargeable and dischargeable storage battery, and is specifically an assembled battery in which a plurality of lithium-ion storage batteries are connected in series. The battery 40 may be a storage battery of another type. In the present embodiment, the battery 40 corresponds to an "electric storage device".

The first inverter 20 is configured such that series-connected bodies of upper arm switches 22 (22A, 22B, and 22C) that are switching elements on the high potential side and lower arm switches 23 (23A, 23B, and 23C) that are switching elements on the low potential side are connected in parallel. In each phase, a first end of the winding 11 of the corresponding phase in the rotating electrical machine 10 is connected to the connection point between the upper arm switch 22 and the lower arm switch 23. In the present embodiment, the switches 22 and 23 are voltage-controlled semiconductor switching elements, specifically, IGBTs. Free-wheel diodes 24 are connected in inverse-parallel to the switches.

The second inverter 30 is configured such that series-connected bodies of upper arm switches 32 (32A, 32B, and 32C) that are switching elements on the high potential side and lower arm switches 33 (33A, 33B, and 33C) that are switching elements on the low potential side are connected in parallel. In each phase, a second end of the winding 11 of the corresponding phase in the rotating electrical machine 10 is connected to the connection point between the upper arm switch 32 and the lower arm switch 33. In the present embodiment, the switches 32 and 33 are voltage-controlled semiconductor switching elements, specifically, IGBTs. Free-wheel diodes 34 are connected in inverse-parallel to the switches.

The high potential side of the battery 40 and the high potential side of the first inverter 20 are connected by a power line LE, and the low potential side of the battery 40 and the low potential side of the first inverter 20 are connected by a ground line LG. The high potential side of the first inverter 20 and the high potential side of the second inverter 30 are connected by a high potential side connection line LU, and the low potential side of the first inverter 20 and the low potential side of the second inverter 30 are connected by a low potential side connection line LD. Accordingly, the second inverter 30 is connected to the battery 40 via the first inverter 20.

A first changeover switch 53 is provided to the high potential side connection line LU. In the present embodiment, the first changeover switch 53 is a voltage-controlled semiconductor switching element, more specifically, an IGBT. A free-wheel diode 54 is connected to the first changeover switch 53 such that the direction of a current flow from the second inverter 30 to the first inverter 20 is the forward direction.

At the start of power running or power generation by the rotating electrical machine 10, the control device 50 acquires detection values from a voltage sensor 51 that detects a power voltage Vbat of the battery 40, a phase current sensor 52 that detects current flowing to the winding 11 of each phase in the rotating electrical machine 10, a rotation speed sensor 58 that detects a rotation speed NE of the rotating electrical machine 10, and the like. Based on the acquired detection values, the control device 50 controls the first inverter 20 and the second inverter 30 in order to control the control amount of the rotating electrical machine 10 to a command value. The control amount is torque TE, for example.

Specifically, in the control of the first inverter 20, the control device 50 outputs first drive signals SG1 corresponding to the switches 22 and 23, to the switches 22 and 23 so that the switches 22 and 23 are alternately turned to the on state (closed state) with dead times in between. The first drive signals SG1 provide either an on command for instructing the switch to change into the on state or an off command for instructing the switch to change into the off state (open state).

In the control of the second inverter 30, the control device 50 outputs second drive signals SG2 corresponding to the switches 32 and 33, to the switches 32 and 33 so that the switches 32 and 33 are alternately turned to the on state with dead times in between.

Based on the acquired detection values, the control device 50 further acquires the operating state of the rotating electrical machine 10. The operating state of the rotating electrical machine 10 may be, for example, a high-speed rotating state or a low-speed rotating state. Then, based on the acquired operating state, the control device 50 generates a first changeover signal SC1 for performing a changeover operation of the first changeover switch 53, and outputs the generated first changeover signal SC1 to the first changeover switch 53. The control device 50 generates the first drive signal SG1 and the second drive signal SG2 so as to correspond to the generated first changeover signal SC1.

Specifically, if the rotating electrical machine 10 is in the high-speed rotating state, the first changeover signal SC1 is set to an on command. Accordingly, the first changeover switch 53 is changed into the on state, and the first inverter 20 and the second inverter 30 are subjected to H-bridge driving. In H-bridge driving, the first inverter 20 and the second inverter 30 are controlled by PWM driving such that the upper arm switch of one of the first inverter 20 and the second inverter 30 and the lower arm switch of the other in the same phase are synchronized. Hereinafter, the operation mode in which the first inverter 20 and the second inverter 30 are subjected to H-bridge driving will be referred to as a second mode. PWM driving is a method of driving by which the states of the upper and lower arm switches of each phase are controlled based on the comparison in magnitude between a target voltage that is a target value of an output voltage to the rotating electrical machine 10 and a carrier signal such as a triangular wave signal. In the present embodiment, the PWM driving corresponds to "switching driving".

Figure 2:
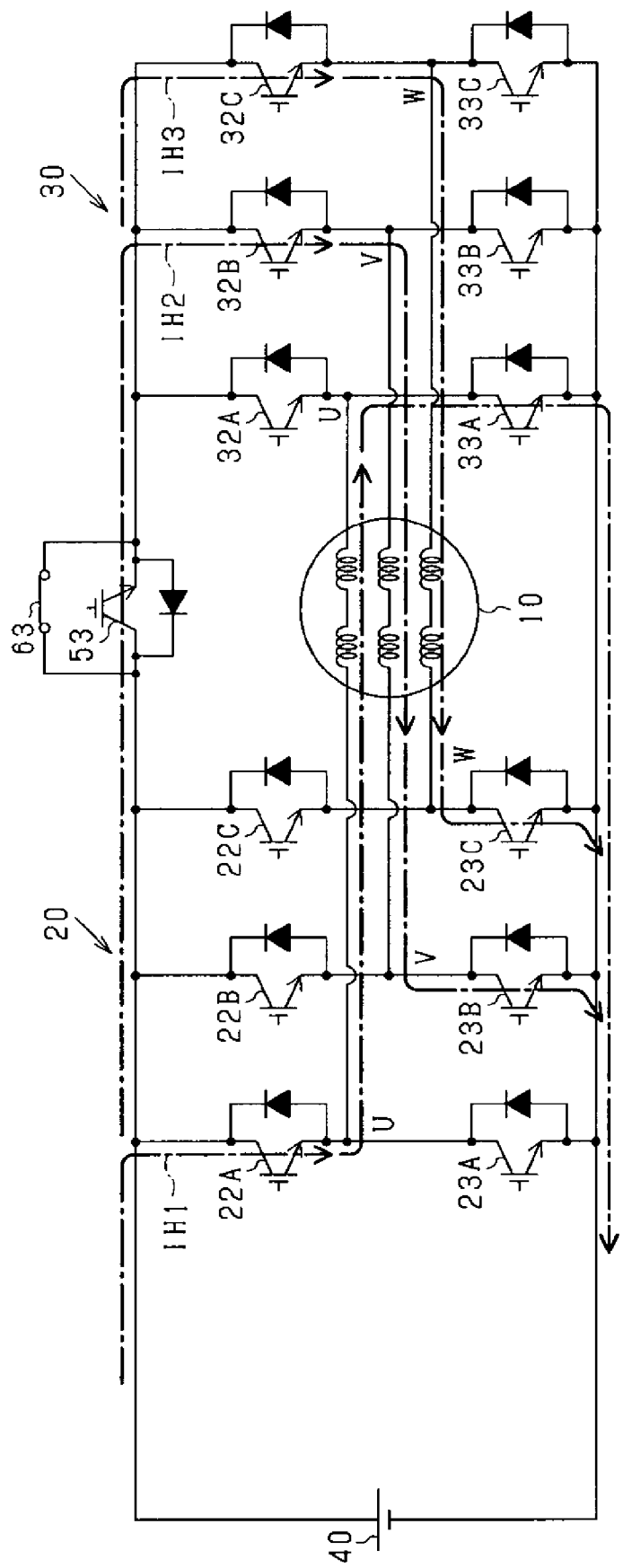
FIG. 2 is a diagram showing current paths in a second mode.

FIG. 2 shows current paths in the second mode during power running of the rotating electrical machine 10. In the example of FIG. 2, the U-phase upper arm switch of the first inverter 20 and the U-phase lower arm switch of the second inverter 30, the V-phase lower arm switch of the first inverter 20 and the V-phase upper arm switch of the second inverter 30, and the W-phase lower arm switch of the first inverter 20 and the W-phase upper arm switch of the second inverter 30, are controlled such that each pair is synchronized. The voltage sensor 51 and the phase current sensor 52 are not illustrated in FIG. 2, and the same applies to FIGS. 3 and 4.

As shown in FIG. 2, when the upper arm switch 22A and the lower arm switches 23B and 23C of the first inverter 20 and the upper arm switches 32B and 32C and the lower arm switch 33A of the second inverter 30 are turned to the on state, current flows in paths indicated with arrows IH1 to IH3.

If the rotating electrical machine 10 is in the low-speed rotating state, the first changeover signal SC1 is set to an off command. Accordingly, the first changeover switch 53 is changed into the off state, and the first inverter 20 and the second inverter 30 are subjected to Y-connection driving. In Y-connection driving, one of the first inverter 20 and the second inverter 30 is controlled by PWM driving and the other is controlled by neutral-point driving. The neutral-point driving is a method of driving by which, among the switches of the relevant inverter, the upper arm switches on the side with the first changeover switch 53 are maintained in the on state, and the lower arm switches on the side without the first changeover switch 53 are maintained in the off state. By neutral-point driving, the relevant inverter is set at a neutral point and the rotating electrical machine 10 is Y-connected. Hereinafter, the operation mode in which the first inverter 20 and the second inverter 30 are subjected to Y-connection driving will be referred to as a first mode.

Figure 3:
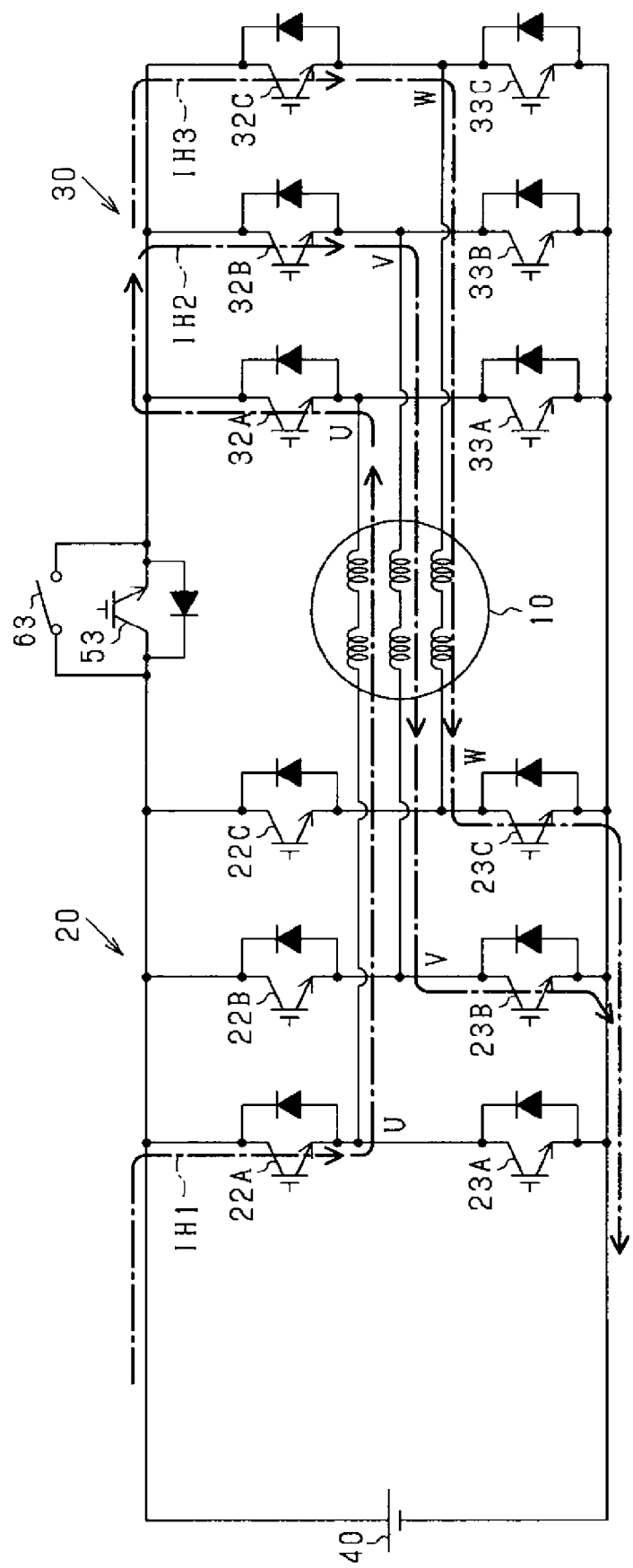
FIG. 3 is a diagram showing current paths at the time of first Y-connection driving in a first mode.

FIG. 3 shows current paths in the first mode during power running of the rotating electrical machine 10. In the example of FIG. 3, the first inverter 20 on the side of the battery 40 is subjected to PWM driving, and the second inverter 30 on the side opposite to the battery 40 is subjected to neutral-point driving.

As shown in FIG. 3, when the upper arm switches 22A and the lower arm switches 23B and 23C of the first inverter 20 and the upper arm switches 32A, 32B, and 32C of the second inverter 30 are turned to the on state, current flows in paths indicated with arrows IY1 to IY3.

Semiconductor switches such as IGBTs have a relatively large on resistance. Thus, if the first changeover switch 53 is a semiconductor switching element, conduction losses in the high potential side connection line LU provided with the first changeover switch 53 increases, which leads to larger power losses in the drive system 70.

The drive system 70 of the present embodiment includes a second changeover switch 63. The second changeover switch 63 is a mechanical relay switch that is connected in parallel to the first changeover switch 53. Based on the operating state of the rotating electrical machine 10, the control device 50 performs a changeover control process in which to generate the first changeover signal SC1 and output the generated first changeover signal SC1 to the first changeover switch 53, and generate the second changeover signal SC2 for performing a changeover operation of the second changeover switch 63 and output the generated second changeover signal SC2 to the second changeover switch 63. In the changeover control process, based on the operating state of the rotating electrical machine 10, the control device 50 changes the operation mode between the first mode and the second mode, and at the time of the changeover between the first mode and the second mode, the control device 50 changes the first changeover switch 53 and the second changeover switch 63 between the on state and the off state. Accordingly, in the drive system 70, it is possible to suppress electric power losses while maintaining high responsiveness at a changeover from the first mode to the second mode.

Figure 4:
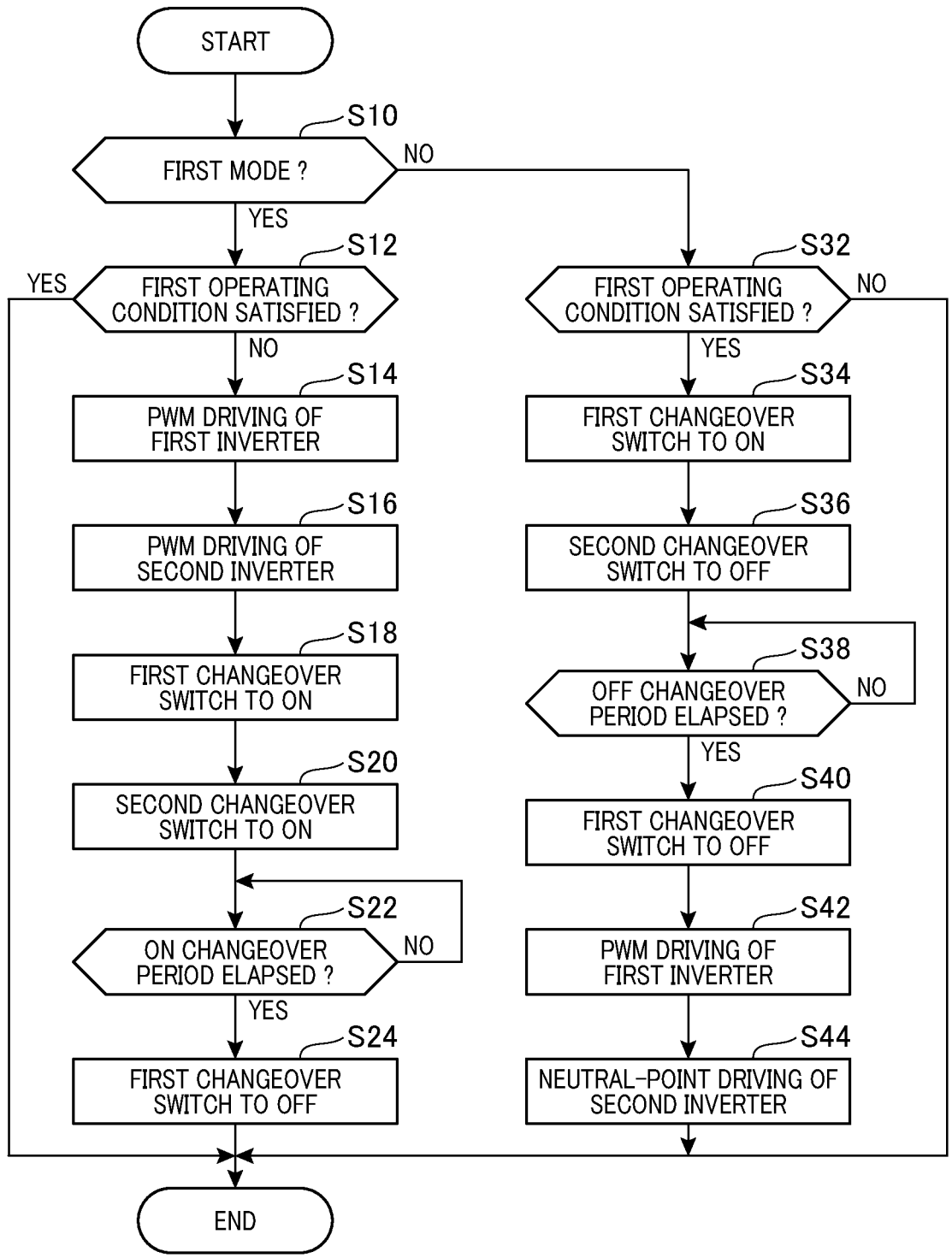
FIG. 4 is a flowchart of a changeover control process according to the first embodiment.

FIG. 4 shows a flowchart of the changeover control process in the present embodiment. In the present embodiment, the flowchart is of the changeover control process during power running of the rotating electrical machine 10. During operation of the rotating electrical machine 10, the control device 50 repeatedly performs the changeover control process at predetermined time intervals.

When the changeover control process is started, first, in step S10, the control device 50 determines whether the operation mode is the first mode. The operation mode is determined based on the operating state of the rotating electrical machine 10.

If determining in the affirmative in step S10, the control device 50 determines in step S12 whether the operating state of the rotating electrical machine 10 satisfies a first operating condition CN1. The first operating condition CN1 is a condition under which the first mode is operable, which is determined by using the rotation speed NE and torque TE of the rotating electrical machine 10. Specifically, if the rotation speed NE is lower than a threshold speed Ntg determined with each torque TE, the first operating condition CN1 is satisfied (see FIG. 6). In the present embodiment, the first operating condition CN1 corresponds to a "predetermined operating condition".

If determining in the affirmative in step S12, the control device 50 terminates the changeover control process. On the other hand, if determining in the negative in step S12, that is, if the first operating condition CN1 is not satisfied, the control device 50 changes the operation mode from the first mode to the second mode and changes the first changeover switch 53 and the second changeover switch 63 from the off state to the on state (S14 to S24). Specifically, the control device 50 changes the first inverter 20 to PWM driving in step S14, and the control device 50 changes the second inverter 30 to PWM driving in step S16.

Subsequently, in step S18, the control device 50 outputs the first changeover signal SC1 as an on command to the first changeover switch 53 to turn the first changeover switch 53 to the on state. Accordingly, the first inverter 20 and the second inverter 30 are changed into the second mode. In the present embodiment, the first changeover signal SC1 as an on command corresponds to a "first on signal".

After outputting the first changeover signal SC1 as an on command to the first changeover switch 53, in step S20, the control device 50 outputs the second changeover signal SC2 as an on command to the second changeover switch 63 to turn the second changeover switch 63 to the on state. Subsequently, in step S22, the control device 50 determines whether, after the changeover of the second changeover switch 63 into the on state, an on changeover period HN required for transition of the second changeover switch 63 from the off state to the on state has elapsed. In the present embodiment, the on changeover period HN corresponds to a "first predetermined period", and the second changeover signal SC2 as an on command corresponds to a "second on signal".

If determining in the negative in step S22, the control device 50 repeats step S22. On the other hand, if determining in the affirmative in step S22, in step S24, the control device 50 outputs the first changeover signal SC1 as an off command to the first changeover switch 53 to change the first changeover switch 53 into the off state, and then terminates the changeover control process. In the present embodiment, the first changeover signal SC1 as an off command corresponds to a "first off signal".

On the other hand, if determining in the negative in step S10, the control device 50 determines in step S32 whether the operating state of the rotating electrical machine 10 satisfies the first operating condition CN1. In the present embodiment, the processing in steps S12 and S32 correspond to a "mode control section".

If determining in the negative in step S32, the control device 50 terminates the changeover control process. On the other hand, if determining in the affirmative in step S32, that is, if the first operating condition CN1 is satisfied, the control device 50 changes the operation mode from the second mode to the first mode and changes the first changeover switch 53 and the second changeover switch 63 from the on state to the off state (S34 to S44). Specifically, in step S34, the control device 50 outputs the first changeover signal SC1 as an on command to the first changeover switch 53 to turn the first changeover switch 53 to the on state.

Subsequently, in step S36, the control device 50 outputs the second changeover signal SC2 as an off command to the second changeover switch 63 to turn the second changeover switch 63 to the off state. Subsequently, in step S38, the control device 50 determines whether, after the changeover of the second changeover switch 63 to the off state, an off changeover period HF required for the transition of the second changeover switch 63 from the on state to the off state has elapsed. In the present embodiment, the off changeover period HF corresponds to a "second predetermined period".

If determining in the negative in step S38, the control device 50 repeats step S38. On the other hand, if determining in the affirmative in step S38, in step S40, the control device 50 outputs the first changeover signal SC1 as an off command to the first changeover switch 53 to change the first changeover switch 53 into the off state. In the present embodiment, the processing in step S18, S20, S36, and S40 corresponds to a "changeover control section".

The control device 50 changes the first inverter 20 to PWM driving in step S42, changes the second inverter 30 into neutral-point driving in step S44, and terminates the changeover control process. Accordingly, the first inverter 20 and the second inverter 30 are changed into the first mode. In the present embodiment, the second changeover signal SC2 as an off command corresponds to a "second off signal".

Figure 5:
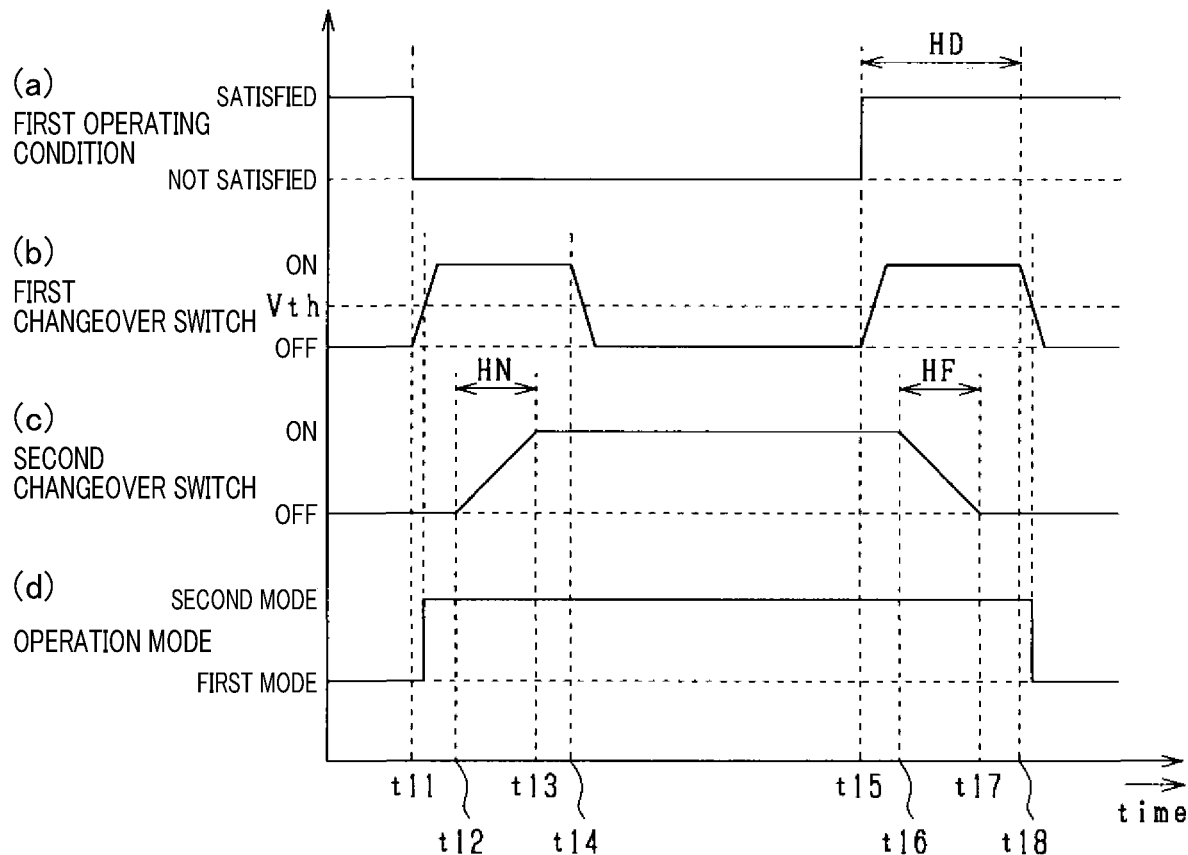
FIG. 5 is a diagram showing state transition of a first changeover switch and a second changeover switch in the changeover control process.

FIG. 5 shows state transition of the first changeover switch 53 and the second changeover switch 63 in the changeover control process. FIG. 5(a) shows the state transition of the rotating electrical machine 10 on satisfaction of the first operating condition CN1, and FIG. 5(b) shows the state transition of the first changeover switch 53, specifically, the transition of a gate voltage applied to a gate terminal of the first changeover switch 53. FIG. 5(c) shows the state transition of the second changeover switch 63, and FIG. 5(c) shows the transition of operation mode of the first inverter 20 and the second inverter 30.

As shown in FIG. 5, when the rotating electrical machine 10 stops satisfying the first operating condition CN1 at time t11, the first changeover signal SC1 as an on command is output to the first changeover switch 53 to change the operation mode of the first inverter 20 and the second inverter 30 from the first mode to the second mode. Then, at time t12, the second changeover signal SC2 as an on command is output to the second changeover switch 63. Accordingly, the second changeover switch 63 is changed to the on state at time t13 after the on changeover period HN has elapsed since time t12.

In the present embodiment, since the first changeover signal SC1 as an on command is output earlier than the second changeover signal SC2 as an on command, the first changeover switch 53 is changed into the on state earlier than the second changeover switch 63. As described above, the switches 22 and 23 constituting the first inverter 20, the switches 22 and 23 constituting the second inverter 30, and the first changeover switch 53 are all semiconductor switches that require a substantially identical time for state change. Therefore, after the first changeover switch 53 is changed into the on state, a voltage equal to or higher than the threshold voltage Vth is applied to the gate terminal of the first changeover switch 53, so that the first changeover switch 53 is changed into the on state and at substantially the same time, the first inverter 20 and the second inverter 30 are changed from the first mode to the second mode. As a result, when the rotating electrical machine 10 stops satisfying the first operating condition CN1, the first inverter 20 and the second inverter 30 can be quickly changed from the first mode to the second mode.

Then, at time t14, that is, after the on changeover period HN has elapsed since the second changeover signal SC2 as an on command was output at time t12, the first changeover signal SC1 as an off command is output to the first changeover switch 53. Accordingly, the first changeover switch 53 is changed to the off state, and the period during which the current flows to the first changeover switch 53 in the second mode is shortened to suppress deterioration of the first changeover switch 53.

When the rotating electrical machine 10 satisfies the first operating condition CN1 at time t15, the first changeover signal SC1 as an on command is output to the first changeover switch 53 in order to change the operation mode of the first inverter 20 and the second inverter 30 from the second mode to the first mode. Accordingly, the first changeover switch 53 and the second changeover switch 63 are both changed to the on state.

Then, at time t16, the second changeover signal SC2 as an off command is output to the second changeover switch 63. Accordingly, the second changeover switch 63 is changed to the off state at time t17 after the off changeover period HF has elapsed since time t16.

Then, at time t18, that is, after the off changeover period HF has elapsed since the output of the second changeover signal SC2 as an off command at time t16, the first changeover signal SC1 as an off command is output to the first changeover switch 53.

In the present embodiment, the first changeover signal SC1 as an off command is output after the off changeover period HF has elapsed since the output of the second changeover signal SC2 as an off command, so that the first changeover switch 53 is changed into the off state later than the second changeover switch 63. Thus, after the first changeover switch 53 is changed into the off state, the voltage applied to the gate terminal of the first changeover switch 53 becomes lower than the threshold voltage Vth. Accordingly, the first changeover switch 53 is changed into the off state and at substantially the same time, the first inverter 20 and the second inverter 30 are changed from the second mode to the first mode.

On the other hand, in the present embodiment, a delay period HD from time t15 to time t18 is required from the instant when the rotating electrical machine 10 satisfies the first operating condition CN1 to the instant when the first inverter 20 and the second inverter 30 are changed into the first mode. Thus, the first inverter 20 and the second inverter 30 cannot be quickly changed from the second mode to the first mode. Therefore, if the first inverter 20 and the second inverter 30 cannot continue the second mode in the delay period HD, the operating state of the rotating electrical machine 10 will become unstable.

In the present embodiment, since the second mode is operable under the first operating condition CN1, it is possible to suppress the operating state of the rotating electrical machine 10 from becoming unstable. Hereinafter, the reason why the second mode is operable under the first operating condition CN1 will be described.

Figure 6:
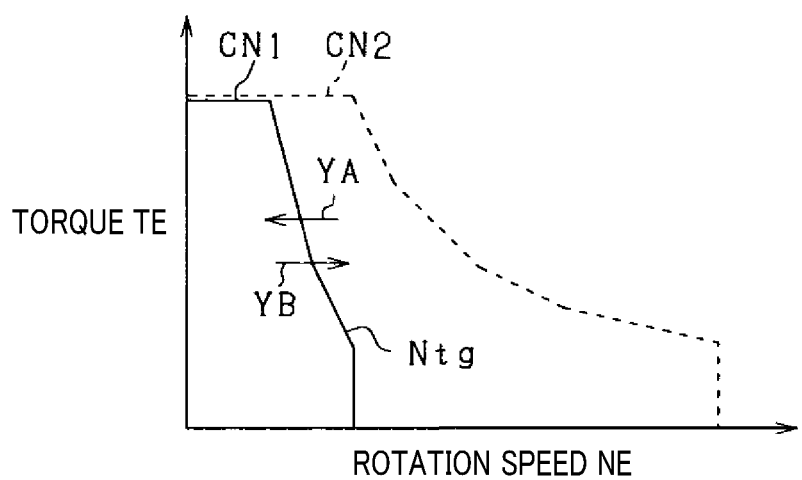
FIG. 6 is a diagram showing the relationship between a first operating condition CN1 and a second operating condition CN2.

FIG. 6 shows the relationship between the first operating condition CN1 and a second operating condition CN2. The second operating condition CN2 is a condition under which the second mode is operable. FIG. 6 shows a range (solid line) satisfying the first operating condition CN1 and a range (broken line) satisfying the second operating condition CN2. As shown in FIG. 6, in the present embodiment, the range satisfying the second operating condition CN2 contains the range satisfying the first operating condition CN1. Thus, the second mode is operable under the first operating condition CN1.

For example, a case where the rotation speed NE of the rotating electrical machine 10 becomes lower than the threshold speed Ntg as shown with an arrow YA will be discussed. In this case, since the first operating condition CN1 is satisfied, the operating mode is changed from the second mode to the first mode. In the present embodiment, since the second mode is operable under the first operating condition CN1, it is not necessary to change the operation mode to the first mode immediately after the first operating condition CN1 is satisfied. Therefore, even when the delay period HD occurs at the changeover from the second mode to the first mode, it is possible to suppress the operating state of the rotating electrical machine 10 from becoming unstable.

In contrast to this, a case where the rotation speed NE of the rotating electrical machine 10 becomes higher than the threshold speed Ntg as shown by an arrow YB will be discussed. In this case, since the first operating condition CN1 is not satisfied, the first mode cannot be continued and the operation mode needs to be quickly changed from the first mode to the second mode. In the present embodiment, at the time of a changeover from the first mode to the second mode, the first changeover switch 53 is changed into the on state earlier than the second changeover switch 63, so that the operation mode can be quickly changed from the first mode to the second mode.

According to the present embodiment described in detail above, the following advantageous effects can be obtained.

In the drive system 70 of the present embodiment, the operation mode of the first inverter 20 and the second inverter 30 is changeable between the first mode and the second mode. At the time of a changeover between the first mode and the second mode, the first changeover switch 53 and the second changeover switch 63 connected in parallel to the high potential side connection line LU are changed between the on state and the off state. The first changeover switch 53 is a semiconductor switch that is higher in changeover responsivity than a relay switch. The second changeover switch 63 is a relay switch that has a smaller on resistance than a semiconductor switch. This suppresses conduction losses in the high potential side connection line LU provided with these switches. As a result, it is possible to suppress electric power losses in the drive system 70 while maintaining high responsivity at the time of a changeover between the first mode and the second mode.

The use of a relay switch would take time for a changeover and exhibit great variations in time required for a changeover. Thus, it is difficult to synchronize a timing for changing the first inverter 20 and the second inverter 30 that are formed by semiconductor switches from the first mode to the second mode and a timing for changing the second changeover switch 63 that is a relay switch from the off state to the on state. In the drive system 70 of the present embodiment, at the time of a changeover from the first mode to the second mode, the first changeover switch 53 and the second changeover switch 63 are changed from the off state to the on state such that, at this changeover, the first changeover signal SC1 as an on command is output earlier than the second changeover signal SC2 as an on command to change earlier the first changeover switch 53 as a semiconductor switch to the on state. As a result, it is possible to preferably synchronize the timing for changing the first inverter 20 and the second inverter 30 from the first mode to the second mode and the timing for changing the first changeover switch 53 as a semiconductor switch from the off state to the on state.

Similarly, it is difficult to synchronize a timing for changing the first inverter 20 and the second inverter 30 from the second mode to the first mode and a timing for changing the second changeover switch 63 from the on state to the off state. In the drive system 70 of the present embodiment, at the time of a changeover from the second mode to the first mode, the first changeover switch 53 and the second changeover switch 63 are changed from the on state to the off state such that, at this changeover, the second changeover signal SC2 as an off command is output and then after the lapse of the off changeover period HE, the first changeover signal SC1 as an off command is output to change later the first changeover switch 53 as a semiconductor switch to the off state. As a result, it is possible to preferably synchronize the timing for changing the first inverter 20 and the second inverter 30 from the second mode to the first mode and the timing for changing the first changeover switch 53 from the on state to the off state.

A relay switch may exhibit a phenomenon of repeating the on state and the off state in a short time (hereinafter, referred to as chattering) after a changeover from the on state to the off state. Thus, at the time of a changeover of the first changeover switch 53 and the second changeover switch 63 from the on state to the off state, if the second changeover switch 63 is changed later to the off state, the second changeover switch 63 as a relay switch may turn to the on state after a changeover to the first mode due to chattering, so that the operating state of the rotating electrical machine 10 becomes unstable. In the drive system 70 of the present embodiment, the first changeover switch 53 as a semiconductor switch is changed later to the off state. The first changeover switch 53 as a semiconductor switch is less likely to cause chattering than a relay switch, which suppresses the operating state of the rotating electrical machine 10 from becoming unstable.

In the drive system 70 of the present embodiment, at the time of a changeover from the first mode to the second mode, the second changeover signal SC2 as an on command is output and then after the lapse of the on changeover period HN, the first changeover signal SC1 as an off command is output to change the first changeover switch 53 into the off state. This shortens the period during which current flows to the first changeover switch 53 in the second mode, thereby suppressing the deterioration of the first changeover switch 53.

In the drive system 70 of the present embodiment, if the first operating condition CN1 is satisfied, the operating mode is changed from the second mode to the first mode, and if the first operating condition CN1 is not satisfied, the operation mode is changed from the first mode to the second mode. Thus, if the first operating condition CN1 is not satisfied, it is necessary to quickly change the operation mode from the first mode to the second mode. In the drive system 70 of the present embodiment, the first changeover switch 53 is a semiconductor switch, and at a changeover from the first mode to the second mode, the first changeover switch 53 is turned to the on state earlier than the second changeover switch 63. Thus, the operation mode can be quickly changed from the first mode to the second mode.

On the other hand, the second changeover switch 63 is a relay switch, and thus the delay period HD occurs at a changeover from the second mode to the first mode. In the drive system 70 of the present embodiment, the second mode is operable under the first operating condition CN1. Thus, even if the first operating condition CN1 is satisfied, it is not necessary to change the operation mode into the first mode immediately after the first operating condition CN1 is satisfied. Therefore, even when the delay period HD occurs at a changeover from the second mode to the first mode, it is possible to suppress the operating state of the rotating electrical machine 10 from becoming unstable.

In the drive system 70 of the present embodiment, the first changeover switch 53 and the second changeover switch 63 are connected in parallel to the high potential side connection line LU. Thus, even if one of these switches suffers an open failure, the other switch can be used to change the operation mode between the first mode and the second mode, thereby appropriately controlling the operating state of the rotating electrical machine 10.

Second Embodiment

Hereinafter, a second embodiment will be described with reference to the drawings, focused on the differences from the first embodiment. The present embodiment is different from the first embodiment in that a drive system 70 includes a second power line LE2. The second power line LE2 connects a high potential side of a battery 40 and a high potential side of a second inverter 30 in paths different from a power line LE and a high potential side connection line LU. In the present embodiment, the power line LE will be referred to as first power line LE1. The same parts shown in FIG. 7 as those shown in FIG. 1 are denoted with the same reference signs, and descriptions thereof will be omitted for the sake of convenience.

The present embodiment is different from the first embodiment in that the driving system 70 includes a third changeover switch 55, a fourth changeover switch 56, a fifth changeover switch 65, and a sixth changeover switch 66. The third changeover switch 55 is provided to the first power line LE1, and the fourth changeover switch 56 is provided to the second power line LE2. In the present embodiment, the switches 55 and 56 are voltage-controlled semiconductor switching elements, more specifically, IGBTs. Free-wheel diodes 57 are connected to the switches 55 and 56 such that the direction of current flow from the corresponding inverter to the battery 40 is the forward direction. In the present embodiment, the first power line LE1 and a ground line LG correspond to a "first connection line", and the second power line LE2, the ground line LG, and the low potential side connection line LD correspond to a "second connection line".

The fifth changeover switch 65 is a mechanical relay switch that is connected in parallel to the third changeover switch 55. The sixth changeover switch 66 is a mechanical relay switch that is connected in parallel to the fourth changeover switch 56. A control device 50 generates third to sixth changeover signals SC3 to SC6 corresponding to the third to sixth changeover switches 55, 56, 65, and 66, and outputs the signals to the corresponding changeover switches 55, 56, 65, and 66, based on the period during which the second mode is utilized, that is, the period during which Y-connection driving is performed.

In the first mode, the control device 50 changes a first inverter 20 and a second inverter 30 between the inverter with PWM driving and the inverter with neutral-point driving based on a predetermined condition. Specifically, the control device 50 changes either one of a group of the third and fifth changeover switches 55 and 65 and a group of the fourth and sixth changeover switches 56 and 66 into the on state, and changes the other group into the off state. More specifically, the control device 50 outputs the third to sixth changeover signals SC3 to SC6 corresponding to the changeover switches 55, 56, 65, and 66, to the changeover switches 55, 56, 65, and 66 in order to alternately turn the switch groups to the on state with dead times in between.

In the example shown in FIG. 3, the third and fifth changeover switches 55 and 65 are turned to the on state and the fourth and sixth changeover switches 56 and 66 are turned to the off state. In this case, the control device 50 performs PWM driving of the first inverter 20 on the side of the third and fifth changeover switches 55 and 65 controlled to the on state, and performs neutral-point driving of the second inverter 30 on the side of the fourth and sixth changeover switches 56 and 66 controlled to the off state. Hereinafter, the Y-connection driving by which to perform PWM driving of the first inverter 20 and perform neutral-point driving of the second inverter 30 will be referred to as first Y-connection driving. In the present embodiment, the first Y-connection driving corresponds to "first driving".

Figure 8:
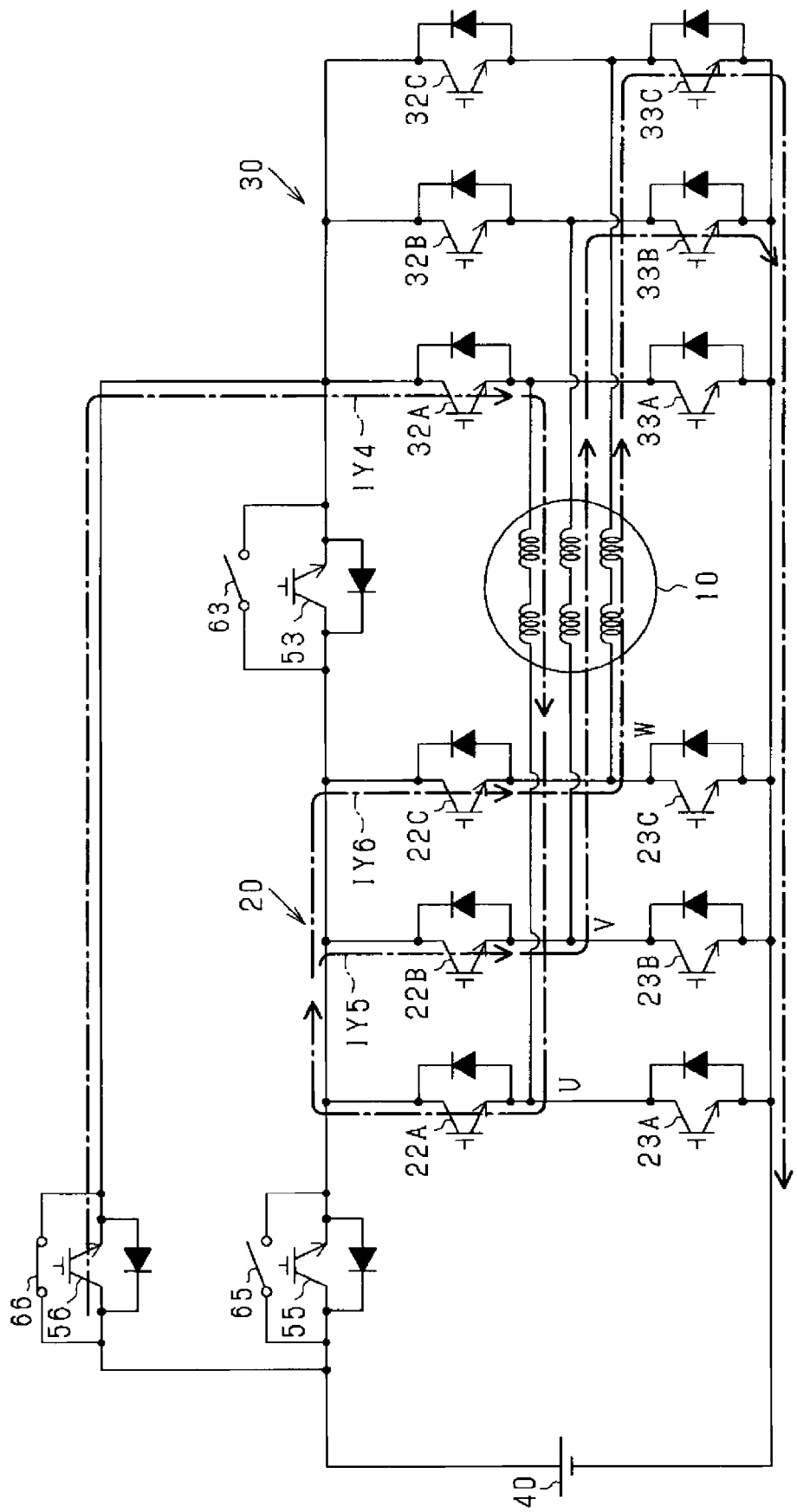
FIG. 8 is a diagram showing current paths at the time of second Y-connection driving in the first mode.

FIG. 8 shows current paths in the first mode during power running of the rotating electrical machine 10. In the example illustrated in FIG. 4, the third and fifth changeover switches 55 and 65 are in the off state and the fourth and sixth changeover switches 56 and 66 are in the on state. In this case, the control device 50 performs PWM driving of the second inverter 30 on the side of the fourth and sixth changeover switches 56 and 66 controlled to the on state, and performs neutral-point driving of the first inverter 20 on the side of the third and fifth changeover switches 55 and 65 controlled to the off state. Hereinafter, the Y-connection driving by which to perform neutral-point driving of the first inverter 20 and perform PWM driving of the second inverter 30 will be referred to as second Y-connection driving. Thus, the Y-connection driving includes the first Y-connection driving and the second Y-connection driving. In the present embodiment, the second Y-connection driving corresponds to "second driving".

As shown in FIG. 8, in the second Y-connection driving, when the upper arm switches 32A, 22B, and 22C of the first inverter 20 and the upper arm switch 32A and lower arm switches 33B and 33C of the second inverter 30 are turned to the on state, current flows in paths indicated with arrows IY4 to IY6.

Figure 9:
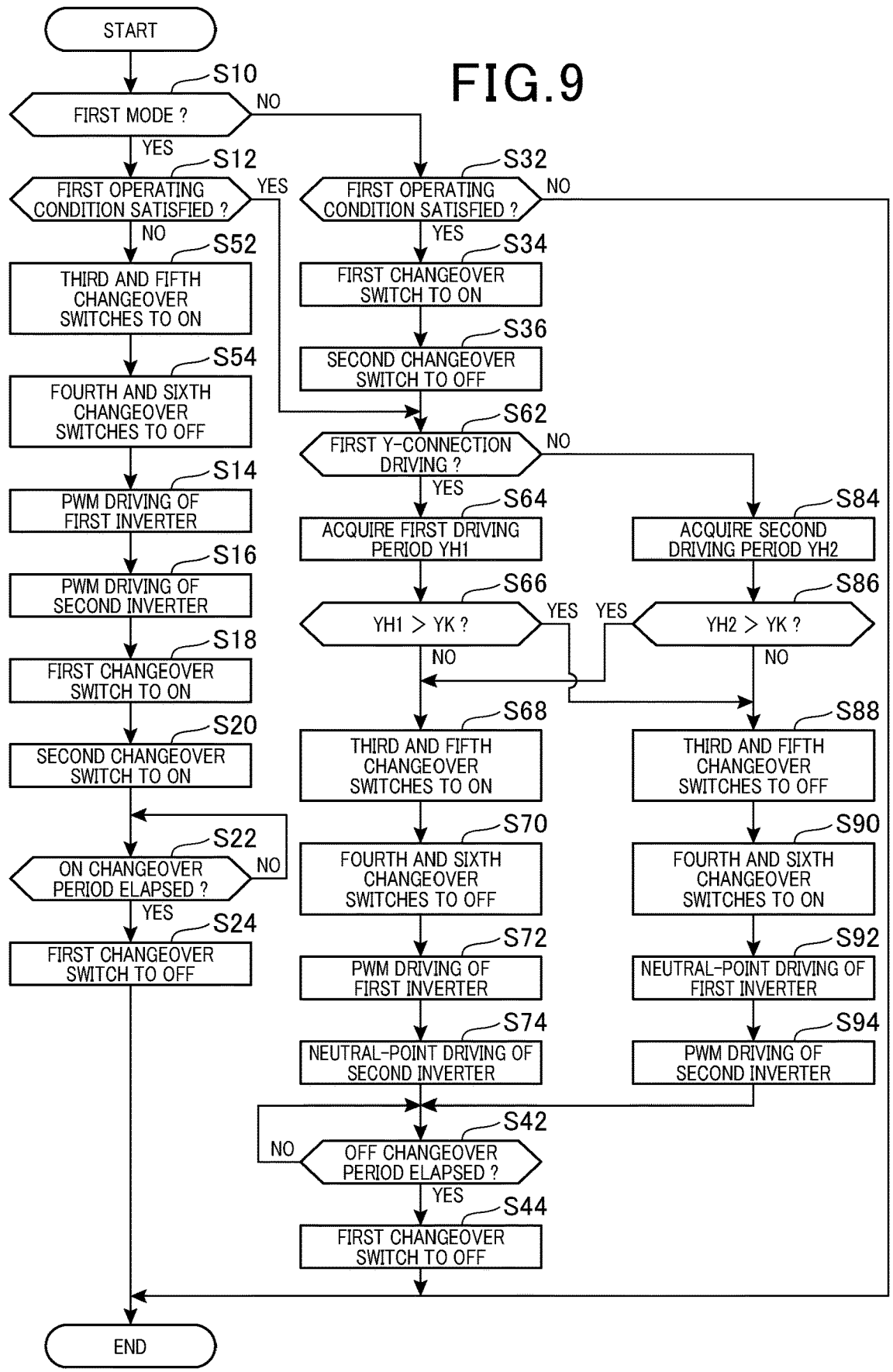
FIG. 9 is a flowchart of a changeover control process according to the second embodiment.

FIG. 9 shows a changeover control process in the present embodiment. The steps shown in FIG. 9 identical to those shown in FIG. 4 are denoted with the identical reference signs, and descriptions thereof will be omitted for the sake of convenience.

In the changeover control process of the present embodiment, if determining in the negative in step S12, that is, at the time of a changeover from the first mode to the second mode, in step S52, the control device 50 outputs the third and fifth changeover signals SC3 and SC5 as on commands to the third and fifth changeover switches 55 and 65, thereby to change the third and fifth changeover switches 55 and 65 from the off state to the on state. When changing the third and fifth changeover switches 55 and 65 into the on state, the control device 50 may change the third changeover switch 55 into the on state earlier than the fifth changeover switch 65, as in the case of changing the first changeover switch 53 and the second changeover switch 63 into the on state. The same applies to the case of changing the fourth and sixth changeover switches 56 and 66 from the off state to the on state.

Subsequently, in step S54, the control device 50 outputs the fourth and sixth changeover signals SC4 and SC6 as off commands to the fourth and sixth changeover switches 56 and 66, thereby to change the fourth and sixth changeover switches 56 and 66 from the on state to the off state. When changing the fourth and sixth changeover switches 56 and 66 into the off state, the control device 50 may change the fourth changeover switch 56 into the off state later than the sixth changeover switch 66, as in the case of changing the first changeover switch 53 and the second changeover switch 63 into the off state. The same applies to the case of changing the third and fifth changeover switches 55 and 65 from the on state to the off state.

On the other hand, if determining in the affirmative in step S12, or when completing the processing in step S36, that is, when maintaining the first mode or changing from the second mode to the first mode, the control device 50 determines in step S62 whether to perform the first Y-connection driving. When changing the operation mode from the second mode to the first mode, the control device 50 performs the first Y-connection driving. If the Y-connection driving in an earlier changeover control process was the first Y-connection driving, the control device 50 performs the first Y-connection driving. The earlier changeover control process is the latest changeover control process in which the Y-connection driving was performed, which, for example, means the previous changeover control process if either one of the first Y-connection driving and the second Y-connection driving was performed in the previous changeover control process.

If determining in the affirmative in step S62, in step S64, the control device 50 acquires a first driving period YH1 that is a period during which the first Y-connection driving is continuously performed. The control device 50 measures the period elapsed from a changeover between the first Y-connection driving and the second Y-connection driving, and acquires the period elapsed since a changeover from the second Y-connection driving to the first Y-connection driving as the first driving period YH1.

In step S66, the control device 50 determines whether the first driving period YH1 acquired in step S64 has exceeded a predetermined reference period YK. The predetermined reference period YK refers to a period during which the first Y-connection driving or the second Y-connection driving can be continuously performed, to suppress excessive temperature rise in the switches of the inverter under PWM driving.

If determining in the negative in step S66, in step S68, the control device 50 outputs the third and fifth changeover signals SC3 and SC5 as on commands to the third and fifth changeover switches 55 and 65 to turn the third and fifth changeover switches 55 and 65 to the on state in order to maintain the first Y-connection driving. Subsequently, in step S70, the control device 50 outputs the fourth and sixth changeover signals SC4 and SC6 as off commands to the fourth and sixth changeover switches 56 and 66 to turn the fourth and sixth changeover switches 56 and 66 to the off state.

In step S72, the control device 50 performs PWM driving of the first inverter 20 on the side of the third and fifth changeover signals SC3 and SC5 having been changed into the on state. Subsequently, in step S74, the control device 50 performs neutral-point driving of the second inverter 30 on the side of the fourth and sixth changeover switches 56 and 66 having been controlled to the off state, and then proceeds to step S42.

On the other hand, if determining in the affirmative in step S66, then in step S88, the control device 50 outputs the third and fifth changeover signals SC3 and SC5 as off commands to the third and fifth changeover switches 55 and 65 to turn the third and fifth changeover switches 55 and 65 to the off state in order to change from the first Y-connection driving to the second Y-connection driving. Then, in step S70, the control device 50 outputs the fourth and sixth changeover signals SC4 and SC6 as on commands to the fourth and sixth changeover switches 56 and 66 to turn the fourth and sixth changeover switches 56 and 66 to the on state.

In step S92, the control device 50 performs neutral-point driving of the first inverter 20 on the side of the third and fifth changeover signals SC3 and SC5 having been changed into the off state. Subsequently, in step S94, the control device 50 performs PWM driving of the second inverter 30 on the side of the fourth and sixth changeover switches 56 and 66 having been controlled to the on state, and then proceeds to step S42.

On the other hand, if determining in the affirmative in step S62, the control device 50 acquires a second driving period YH2 during which the second Y-connection driving is continuously performed. Subsequently, in step S86, the control device 50 determines whether the second driving period YH2 acquired in step S84 has exceeded the reference period YK.

If determining in the negative in step S86, the control device 50 proceeds to step S88 in order to maintain the second Y-connection driving. On the other hand, if determining in the affirmative in step S86, the control device 50 proceeds to step S68 in order to change from the second Y-connection driving to the first Y-connection driving. In the present embodiment, the processing in steps S66 and S86 corresponds to a "driving changeover section", and the processing in steps S66 and S86 corresponds to a "driving changeover section", and the processing in steps S18, S20, S36, S44, S52, S54, S68, S70, S88, and S90 corresponds to a "changeover control section".

According to the present embodiment described above, the third changeover switch 55 and the fifth changeover switch 65 are connected in parallel to the first power line LE1, and at the time of a changeover from the first Y-connection driving to the second Y-connection driving, these switches are changed from the off state to the on state. In addition, at the time of a changeover from the second Y-connection driving to the first Y-connection driving, these switches are changed from the on state to the off state. The third changeover switch 55 is a semiconductor switch that is higher in changeover responsivity than a relay switch. The fifth changeover switch 65 is a relay switch that has a smaller on resistance than a semiconductor switch. This suppresses conduction losses in the first power line LE1 provided with these switches. As a result, it is possible to suppress electric power losses in the drive system 70 while maintaining high responsivity at the time of a changeover between the first Y-connection driving and the second Y-connection driving.

According to the present embodiment, the fourth changeover switch 56 and the sixth changeover switch 66 are connected in parallel to the second power line LE2, and at the time of a changeover from the second Y-connection driving to the first Y-connection driving, these switches are changed from the on state to the off state. In addition, at the time of a changeover from the first Y-connection driving to the second Y-connection driving, these switches are changed from the off state to the on state. The fourth changeover switch 56 is a semiconductor switch that is higher in changeover responsivity than a relay switch. The sixth changeover switch 65 is a relay switch that has a smaller on resistance than a semiconductor switch. This suppresses conduction losses in the second power line LE2 provided with these switches. As a result, it is possible to suppress electric power losses in the drive system 70 while maintaining high responsivity at the time of a changeover between the first Y-connection driving and the second Y-connection driving.

Third Embodiment

Figure 7:
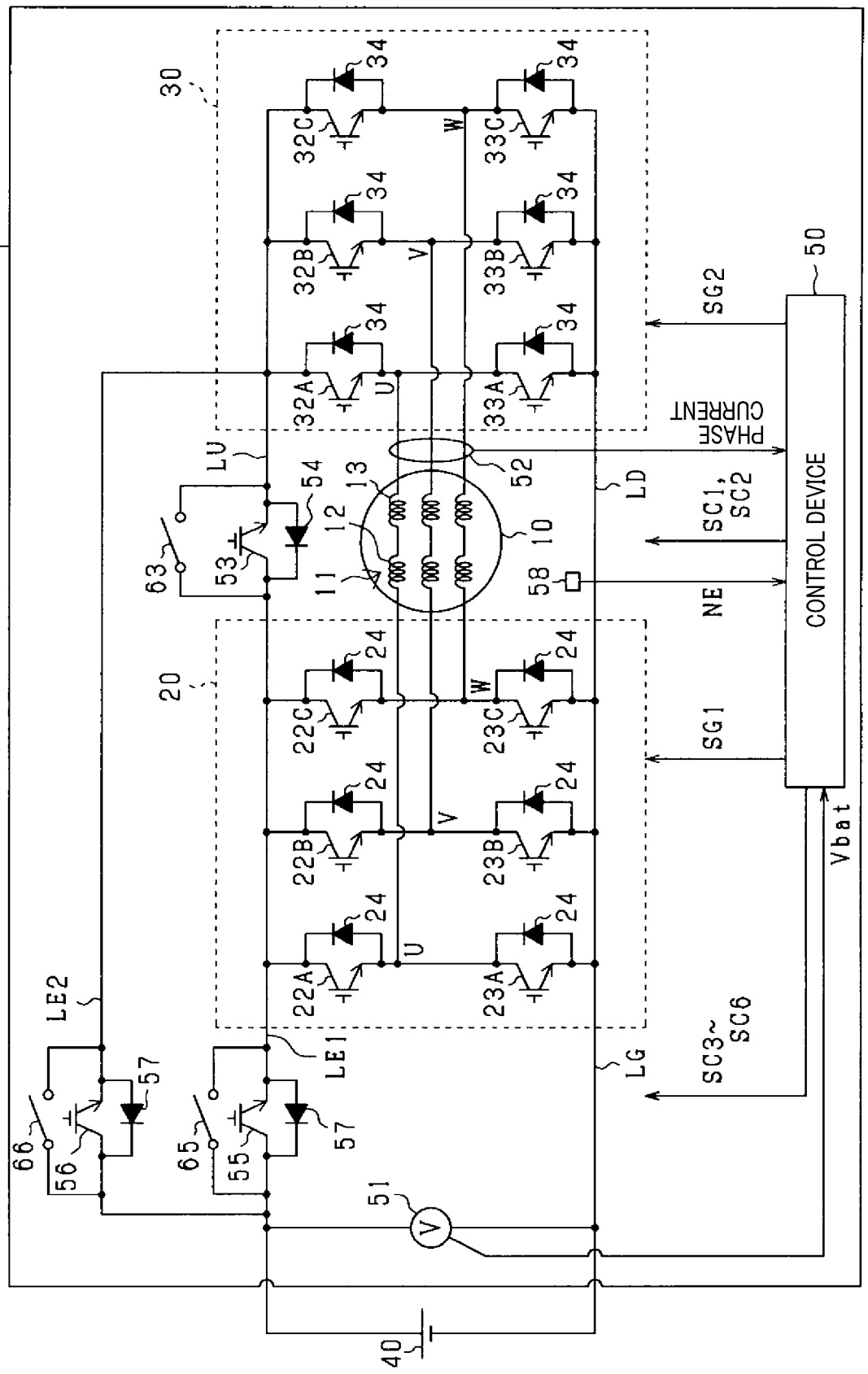
FIG. 7 is an overall configuration diagram of a drive system according to a second embodiment.

Hereinafter, a third embodiment will be described with reference to the drawings, focused on the differences from the second embodiment. The present embodiment is different from the second embodiment in that a drive system 70 includes a second ground line LG2 instead of the second power line LE2. The second ground line LG2 connects a low potential side of a battery 40 and a low potential side of a second inverter 30 in paths different from a ground line LG and a low potential side connection line LD. In the present embodiment, a first power line LE1 will be referred to as a power line LE, and the ground line LG will be referred to as a first ground line LG1. The parts shown in FIG. 10 identical to those shown in FIGS. 1 and 7 are denoted with identical reference signs, and descriptions thereof will be omitted for the sake of convenience.

The present embodiment is different from the second embodiment in including first to sixth low voltage side changeover switches 53D, 55D, 56D, 63D, 65D, and 66D, instead of the first to sixth changeover switches 53, 55, 56, 63, 65, and 66. The first low voltage side changeover switch 53D is provided to the low potential side connection line LD. In the present embodiment, the first low voltage side changeover switch 53D is a voltage-controlled semiconductor switching element, more specifically, an IGBT. A free-wheel diode 54D is connected to the first low voltage side changeover switch 53D such that the direction of current flow from a first inverter 20 to a second inverter 30 is the forward direction. The second low voltage side changeover switch 63D is connected in parallel to the first low voltage side changeover switch 53D. The first and second low voltage side changeover switches 53D and 63D are operated for a changeover by first and second changeover signals SC1 and SC2.

The third low voltage side changeover switch 55D is provided to the first ground line LG1, and the fourth low voltage side changeover switch 56D is provided to the second ground line LG2. In the present embodiment, the switches 55D and 56D are voltage-controlled semiconductor switching elements, more specifically, IGBTs. Free-wheel diodes 57D are connected to the switches 55D and 56D such that the direction of current flow from the battery 40 to the corresponding inverter is the forward direction. The fifth low voltage side changeover switch 65D is connected in parallel to the third low voltage side changeover switch 55D. The sixth low voltage side changeover switch 66D is connected in parallel to the fourth low voltage side changeover switch 56D. The third to sixth low voltage changeover switches 55D, 56D, 65D, and 66D are operated for a changeover by third to sixth changeover signals SC3 to SC6.

According to the present embodiment described above, the first low voltage side changeover switch 53D and the second low voltage side changeover switch 63D are connected in parallel to the low potential side connection line LD, and at the time of a changeover between the first mode and the second mode, these switches are changed between the on state and the off state. Thus, it is possible to suppress electric power losses in the drive system 70 while maintaining high responsivity at the time of a changeover between the first mode and the second mode.

According to the present embodiment, the third low voltage side changeover switch 55D and the fifth low voltage side changeover switch 65D are connected in parallel to the first ground line LG1, and at the time of a changeover between the first Y-connection driving and the second Y-connection driving, these switches are changed between the on state and the off state. Thus, it is possible to suppress electric power losses in the drive system 70 while maintaining high responsivity at the time of a changeover between the first Y-connection driving and the second Y-connection driving.

According to the present embodiment, the fourth low voltage side changeover switch 56D and the sixth low voltage side changeover switch 66D are connected in parallel to the second ground line LG2, and at the time of a changeover between the first Y-connection driving and the second Y-connection driving, these switches are changed between the on state and the off state. Thus, it is possible to suppress electric power losses in the drive system 70 while maintaining high responsivity at the time of a changeover between the first Y-connection driving and the second Y-connection driving.

In particular, in the drive system 70 of the present embodiment, the first to sixth low voltage side changeover switches 53D, 55D, 56D, 63D, 65D, and 66D are provided to the low potential side of the battery 40. Thus, the potentials applied to these switches are lower than those in the case where the switches are provided to the high potential side of the battery 40, thereby suppressing the deterioration of these switches.

Fourth Embodiment

Figure 10:
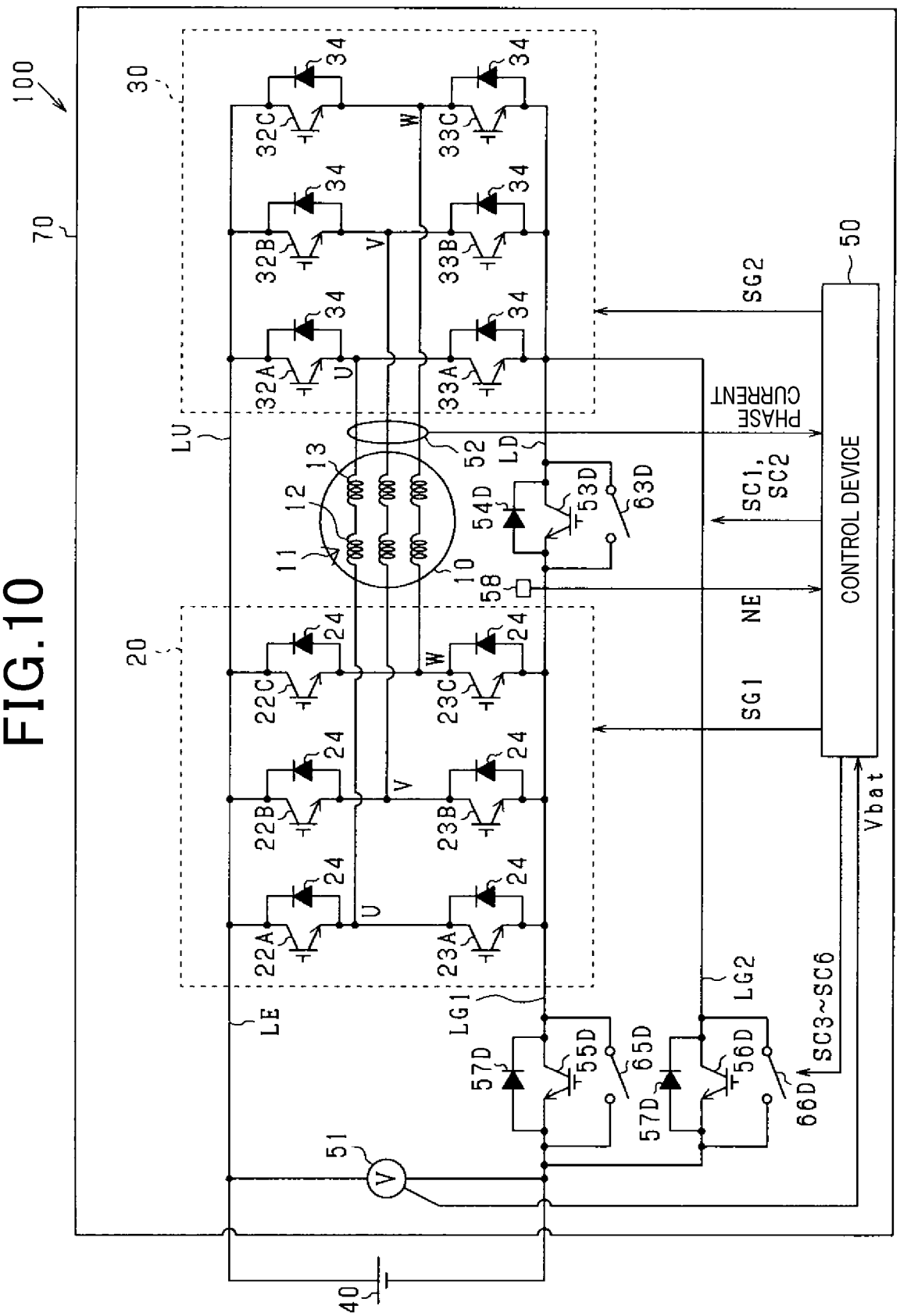
FIG. 10 is an overall configuration diagram of a drive system according to a third embodiment.
Figure 11:
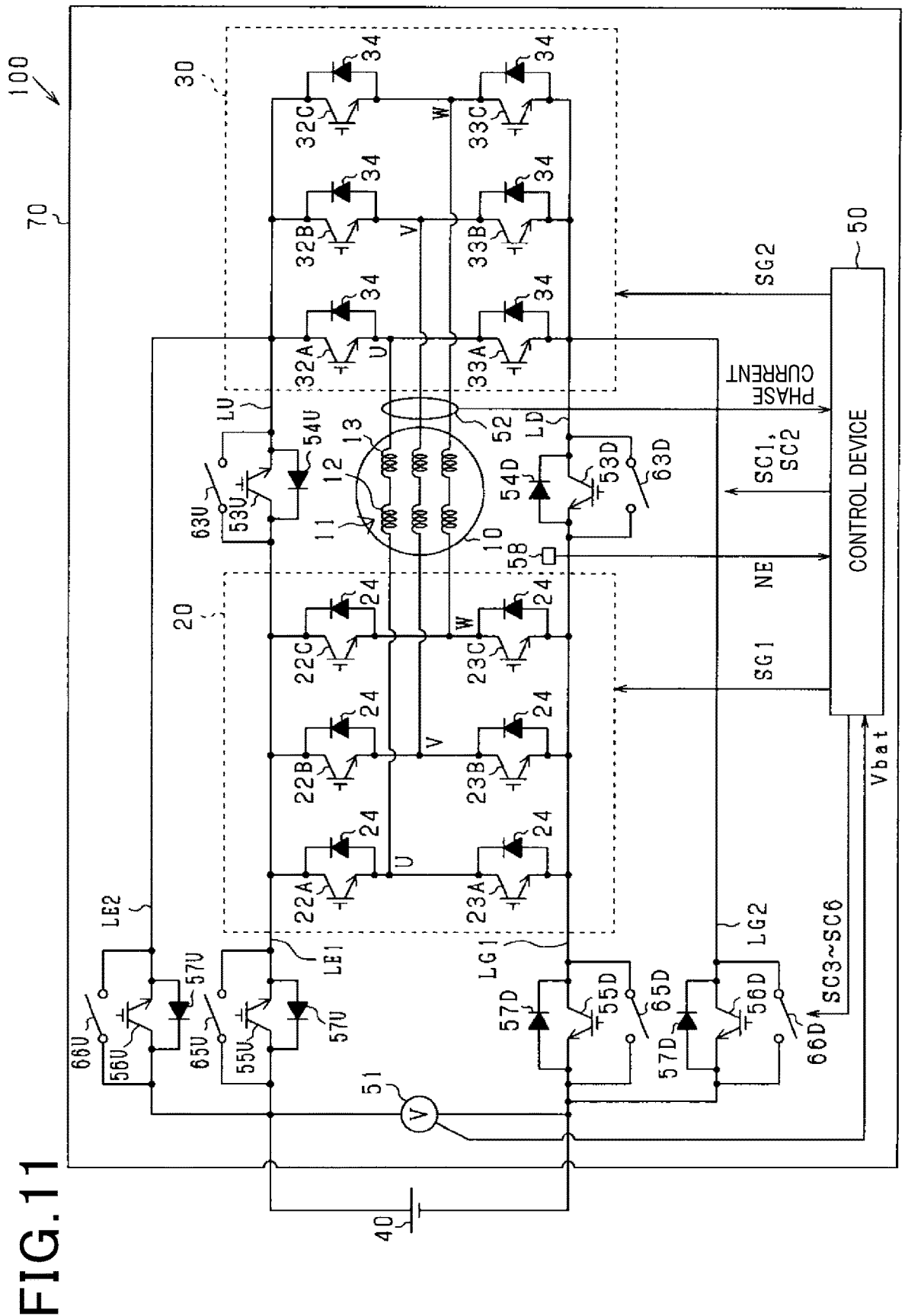
FIG. 11 is an overall configuration diagram of a drive system according to a fourth embodiment.

Hereinafter, a fourth embodiment will be described with reference to the drawings, focused on the differences from the second and third embodiments. The present embodiment is different from the second and third embodiments in that a drive system 70 includes a second ground line LG2 in addition to a second power line LE2. The parts shown in FIG. 11 identical to those shown in FIGS. 7 and 10 are denoted with identical reference signs, and descriptions thereof will be omitted for the sake of convenience The present embodiment is different from the second and third embodiments in that the drive system 70 includes first to sixth low voltage side changeover switches 53D, 55D, 56D, 63D, 65D, and 66D in addition to the first to sixth changeover switches 53, 55, 56, 63, 65, and 66. In the present embodiment, the first to sixth changeover switches 53, 55, 56, 63, 65, and 66 will be referred to as first to sixth high voltage side changeover switches 53U, 55U, 56U, 63U, 65U, and 66U.

- According to the present embodiment described above, the first high voltage side changeover switch 53U and the second high voltage side changeover switch 63U are connected in parallel to the high potential side connection line LU, and the first low voltage side changeover switch 53D and the second low voltage side changeover switch 63D are connected in parallel to the low potential side connection line LD. At the time of a changeover between the first mode and the second mode, these switches are changed between the on state and the off state. Thus, it is possible to suppress electric power losses in the drive system 70 while maintaining high responsivity at the time of a changeover between the first mode and the second mode.
- According to the present embodiment, the third high voltage side changeover switch 55U and the fifth high voltage side changeover switch 65U are connected in parallel to the first power line LE1, and the third low voltage side changeover switch 55D and the fifth low voltage side changeover switch 65D are connected in parallel to the first ground line LG1. At the time of a changeover between the first Y-connection driving and the second Y-connection driving, these switches are changed between the on state and the off state. Thus, it is possible to suppress electric power losses in the drive system 70 while maintaining high responsivity at the time of a changeover between the first Y-connection driving and the second Y-connection driving.
- According to the present embodiment, the fourth high voltage side changeover switch 56U and the sixth high voltage side changeover switch 66U are connected in parallel to the second power line LE2, and the fourth low voltage side changeover switch 56D and the sixth low voltage side changeover switch 66D are connected in parallel to the second ground line LG2. At the time of a changeover between the first Y-connection driving and the second Y-connection driving, these switches are changed between the on state and the off state. Thus, it is possible to suppress electric power losses in the drive system 70 while maintaining high responsivity at the time of a changeover between the first Y-connection driving and the second Y-connection driving.
- In particular, in the drive system 70 of the present embodiment, the first and second high voltage side changeover switches 53U and 63U are provided to the high potential side connection line LU, and the first and second low voltage side changeover switches 53D and 63D are provided to the low potential side connection line LD. In the first mode, the first and second high voltage side changeover switches 53U and 63U and the first and second low voltage side changeover switches 53D and 63D are maintained in the off state. Thus, in an inverter subjected to neutral-point driving in the first mode, it is possible to maintain both the upper arm switches and the lower arm switches in the off state and distribute the current flowing in the relevant inverter into the upper arm switches and the lower arm switches. This suppresses electric power losses in the inverter subjected to neutral-point driving, in comparison with the case where only either of the upper arm switches and the lower arm switches can be turned to the off state.

Other Embodiments

The embodiments described above can be modified as described below.

- In each of the embodiments described above, the changeover control process is performed during power running of the rotating electrical machine 10. Alternatively, the changeover control process may be performed at power generation of the rotating electrical machine 10. At power generation of the rotating electrical machine 10 as well, the operation mode may be changed between the first mode and the second mode in accordance with the operating state of the rotating electrical machine 10, and the first changeover switch 53 and the second changeover switch 63 may be changed between the on state and the off state.
- In each of the embodiments described above, as an example, at the time of a changeover of the first changeover switch 53 and the second changeover switch 63 from the off state to the on states, the first changeover signal SC1 as an on command is output to the first changeover switch 53, and after the first changeover switch 53 is changed into the on state, the second changeover signal SC2 as an on command is output to the second changeover switch 63. However, the present disclosure is not limited to this example. The first changeover signal SC1 as an on command is output to the first changeover switch 53, and before the first changeover switch 53 is changed into the on state, the second changeover signal SC2 as an on command may be output to the second changeover switch 63. In this case as well, the first changeover switch 53 can be changed into the on state earlier than the second changeover switch 63 due to the difference in responsivity between the first changeover switch 53 as a semiconductor switch and the second changeover switch 63 as a relay switch.
- In each of the embodiments described above, during the operation in the second mode, after the second changeover switch 63 is changed into the on state, the first changeover switch 53 is changed into the off state as an example. However, the first changeover switch 53 does not necessarily need to be changed into the off state.
- In each of the embodiments described above, the switching driving is PWM driving as an example, but the present disclosure is not limited to this example. Instead, rectangular drive, for example, may be performed. Rectangular driving is a method of driving by which to turn upper and lower arm switches to the on state each once with a dead time in one cycle of electrical angle and control the switching patterns of the upper and lower arm switches of each phase so as to be displaced by 120° from each other. Alternatively, overmodulation driving may be performed. Overmodulation driving is a method of driving by which to keep the upper and lower arm switches of each phase in the on state over a plurality of carrier cycles such that the maximum value of an output voltage to the rotating electrical machine 10 becomes 2/π times greater than a power supply voltage Vbat of the battery 40.

The switches included in the first inverter 20 and the second inverter 30 are not limited to IGBTs but may be MOSFETs, for example. In this case, MOSFET body diodes can be used as diodes reversely connected to the switches so that it is not necessary to use free wheel diodes separately from the MOSFETs.

The rotating electrical machine 10 is not limited to three phases but may have two phases or four or more phases. The first inverter 20 and the second inverter 30 are inverters that include a number of series-connected bodies of upper and lower arm switches corresponding to the number of phases of the rotating electrical machine 10. For example, in the case of two phases, the connection point between upper and lower arm switches series-connected to each other in the first set and the connection point between upper and lower arm switches series-connected to each other in the second set are connected together via an inductive load (for example, a winding).

The present disclosure has been described in accordance with embodiments but is not limited to the embodiments, structures, and the like. The present disclosure also includes various modifications and changes in a range of equivalency. In addition, various combinations and modes, and other combinations and modes including only one element of the foregoing combinations and modes, less or more than the one element are included in the scope and conceptual range of the present disclosure.

The present disclosure provides a drive system (70) that is applied to a rotating electrical machine system (100) having a rotating electrical machine (10) with multi-phase windings (11), the drive system including: a first inverter (20) that has an upper arm switch (22) and a lower arm switch (23) connected in series in each phase and has a connection point between the upper arm switch and the lower arm switch connected to a first end of the winding of each phase; a second inverter (30) that has an upper arm switch (32) and a lower arm switch (33) connected in series in each phase and has a connection point between the upper arm switch and the lower arm switch connected to a second end of the winding of each phase; a high potential side connection line (LU) that connects a high potential side of the first inverter and a high potential side of the second inverter; a low potential side connection line (LD) that connects a low potential side of the first inverter and a low potential side of the second inverter; a first changeover switch (53) that is a semiconductor switch provided to at least one of the high potential side connection line and the low potential side connection line; a second changeover switch (63) that is a relay switch connected in parallel to the first changeover switch; a mode control section that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters; and a changeover control section that, at a time of a changeover between the first mode and the second mode by the mode control section, changes the first changeover switch and the second changeover switch between the on state and off state.

In the drive system of the present disclosure, the first inverter and the second inverter connected to the corresponding ends of the winding of each phase in the rotating electrical machine are changeable between the first mode and the second mode. At the time of a changeover between the first mode and the second mode, the first changeover switch and the second changeover switch connected in parallel to at least one of the high potential side connection line and the low potential side connection line are changed between the on state and the off state. The first changeover switch is a semiconductor switch that is higher in changeover responsivity than a relay switch. The second changeover switch is a relay switch that has a smaller on resistance than a semiconductor switch. This suppresses conduction losses in the connection lines provided with these switches. As a result, it is possible to suppress power losses in the drive system while maintaining high responsivity at the time of a changeover between the first mode and the second mode.

What is claimed is:

1. A drive system applied to a rotating electrical machine system having a rotating electrical machine with multi-phase windings, the drive system comprising:
    a first inverter that has an upper arm switch and a lower arm switch connected in series in each phase and has a connection point between the upper arm switch and the lower arm switch connected to a first end of the winding of each phase;
    a second inverter that has an upper arm switch and a lower arm switch connected in series in each phase and has a connection point between the upper arm switch and the lower arm switch connected to a second end of the winding of each phase;
    a high potential side connection line that connects a high potential side of the first inverter and a high potential side of the second inverter;
    a low potential side connection line that connects a low potential side of the first inverter and a low potential side of the second inverter;
    a first changeover switch that is a semiconductor switch provided to at least one of the high potential side connection line and the low potential side connection line;
    a second changeover switch that is a relay switch connected in parallel to the first changeover switch; and
    a control device that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters, wherein:
    the control device is further configured to, at a time of a changeover between the first mode and the second mode by the control device, changes the first changeover switch and the second changeover switch between the on state and off state
    the upper and lower arm switches of the first inverter and the second inverter are semiconductor switches, and
    at a time of a changeover from the first mode to the second mode, the control device changes the first changeover switch and the second changeover switch from the off state to the on state, and at the time of the changeover, the control device outputs a first on signal for turning the first changeover switch to the on state, and then outputs a second on signal for turning the second changeover switch to the on state.

2. The drive system according to claim 1, wherein, at the time of a changeover from the first mode to the second mode, the control device section outputs a first off signal for turning the first changeover switch to the off state after a lapse of a first predetermined period required for transition of the second changeover switch from the off state to the on state since the output of the second on signal.

3. A drive system applied to a rotating electrical machine system having a rotating electrical machine with multi-phase windings, the drive system comprising:
a first inverter that has an upper arm switch and a lower arm switch connected in series in each phase and has a connection point between the upper arm switch and the lower arm switch connected to a first end of the winding of each phase;
a second inverter that has an upper arm switch and a lower arm switch connected in series in each phase and has a connection point between the upper arm switch and the lower arm switch connected to a second end of the winding of each phase;
a high potential side connection line that connects a high potential side of the first inverter and a high potential side of the second inverter;
a low potential side connection line that connects a low potential side of the first inverter and a low potential side of the second inverter;
a first changeover switch that is a semiconductor switch provided to at least one of the high potential side connection line and the low potential side connection line;
a second changeover switch that is a relay switch connected in parallel to the first changeover switch; and
a control device that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters, wherein:
the control device is further configured to, at a time of a changeover between the first mode and the second mode by the control device, changes the first changeover switch and the second changeover switch between the on state and off state
the upper and lower arm switches of the first inverter and the second inverter are semiconductor switches, and
at a time of a changeover from the second mode to the first mode, the control device changes the first changeover switch and the second changeover switch from the on state to the on state, and at the time of the changeover, the control device outputs a second off signal for turning the second changeover switch to the off state, and then outputs a first off signal for turning the first changeover switch to the off state after a lapse of a second predetermined period required for transition of the second changeover switch from the on state to the off state since the output of the second off signal.

4. A drive system applied to a rotating electrical machine system having a rotating electrical machine with multi-phase windings, the drive system comprising:
a first inverter that has an upper arm switch and a lower arm switch connected in series in each phase and has a connection point between the upper arm switch and the lower arm switch connected to a first end of the winding of each phase;
a second inverter that has an upper arm switch and a lower arm switch connected in series in each phase and has a connection point between the upper arm switch and the lower arm switch connected to a second end of the winding of each phase;
a high potential side connection line that connects a high potential side of the first inverter and a high potential side of the second inverter;
a low potential side connection line that connects a low potential side of the first inverter and a low potential side of the second inverter;
a first changeover switch that is a semiconductor switch provided to at least one of the high potential side connection line and the low potential side connection line;
a second changeover switch that is a relay switch connected in parallel to the first changeover switch; and
a control device that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters, wherein:
the control device is further configured to, at a time of a changeover between the first mode and the second mode by the control device, changes the first changeover switch and the second changeover switch between the on state and off state,
if a predetermined operating condition is satisfied, the control device changes from the second mode to the first mode, and if the predetermined operating condition is not satisfied, the control device from the first mode to the second mode, and
the second mode is operable under the predetermined operating condition.

5. A drive system applied to a rotating electrical machine system having a rotating electrical machine with multi-phase windings, the drive system comprising:
a first inverter that has an upper arm switch and a lower arm switch connected in series in each phase and has a connection point between the upper arm switch and the lower arm switch connected to a first end of the winding of each phase;
a second inverter that has an upper arm switch and a lower arm switch connected in series in each phase and has a connection point between the upper arm switch and the lower arm switch connected to a second end of the winding of each phase;
a high potential side connection line that connects a high potential side of the first inverter and a high potential side of the second inverter;
a low potential side connection line that connects a low potential side of the first inverter and a low potential side of the second inverter;
a first changeover switch that is a semiconductor switch provided to at least one of the high potential side connection line and the low potential side connection line;
a second changeover switch that is a relay switch connected in parallel to the first changeover switch; and a control device that changes between a first mode in which to perform switching driving of the upper and lower arm switches in one of the first inverter and the second inverter and perform neutral point driving of at least one of the upper and lower arm switches in the other inverter to maintain in an on state and a second mode in which to perform switching driving of the upper and lower arm switches in both the inverters, wherein:

the control device is further configured to, at a time of a changeover between the first mode and the second mode by the control device, changes the first changeover switch and the second changeover switch between the on state and off state the rotating electrical machine system includes an electric storage device that receives and supplies electric power to and from the rotating electrical machine, the drive system comprises:
  a third changeover switch that is a semiconductor switch provided to a first connection line connecting the electric storage device and the first inverter;
  a fourth changeover switch that is a semiconductor switch provided to a second connection line connecting the electric storage device and the second inverter;
  a fifth changeover switch that is a relay switch connected in parallel to the third changeover switch;
  a sixth changeover switch that is a relay switch connected in parallel to the fourth changeover switch; and
  a driving changeover section that, during operation in the first mode, changes between first driving by which to perform the switching driving of the first inverter and perform the neutral-point driving of the second inverter and second driving by which to perform the neutral-point driving of the first inverter and perform the switching driving of the second inverter, and at the time of a changeover from the first driving to the second driving by the driving changeover section, the control device changes the third changeover switch and the fifth changeover switch from the on state to the off state and changes the fourth changeover switch and the sixth changeover switch from the off state to the on state, and at the time of a changeover from the second driving to the first driving by the driving changeover section, the control device changes the third changeover switch and the fifth changeover switch from the off state to the on state and changes the fourth changeover switch and the sixth changeover switch from the on state to the off state.

* * * * *